United States Patent
Gerbracht

[15] 3,688,727
[45] Sept. 5, 1972

[54] STEERING, ENGINE AND TRANSMISSION CONTROL FOR BOATS

[72] Inventor: Fred Gerbracht, 2325 Seidenberg Ave., Key West, Fla. 33040

[22] Filed: June 25, 1970

[21] Appl. No.: 49,737

[52] U.S. Cl. ............... 114/144 R, 74/89.22, 74/89.2, 114/154
[51] Int. Cl. .......................................... B63h 25/10
[58] Field of Search ............. 114/144, 154; 244/83 B; 74/89.22, 89.2

[56] References Cited

UNITED STATES PATENTS

| | | | |
|---|---|---|---|
| 3,545,398 | 12/1970 | Fisher | 114/144 |
| 2,445,940 | 7/1948 | Copeland | 114/144 UX |
| 2,629,356 | 2/1953 | Whiting | 114/144 |
| 944,879 | 12/1909 | Larkin | 114/154 |

Primary Examiner—Andrew H. Farrell
Attorney—Clarence A. O'Brien and Harvey B. Jacobson

[57] ABSTRACT

An integrated control system for motorboats consisting of a steering wheel journaled on the upper end of an upright control column supported at its lower end from an oscillatable transverse shaft on the cockpit floor of an associated motorboat and linked to the throttle of the boat whereby the latter can be steered and throttled simultaneously with one hand. Shift, starter and other engine control functions are grouped in a shift lever within the grasp of an operator of the boat controlling the steering wheel and the throttle whereby the steering wheel may be controlled with one hand and the shift, starter and other engine control functions may be controlled by the other hand. All controls and instruments are mounted in a low, narrow console that is adjustably positionable, with the control column, transverse shaft and steering wheel, wherever desired along the side of the motorboat cockpit, the invention being particularly well adapted for use in connection with, but not restricted to, a straight-sided boat such as that disclosed in U.S. Pat. No. 3,450,084.

19 Claims, 16 Drawing Figures

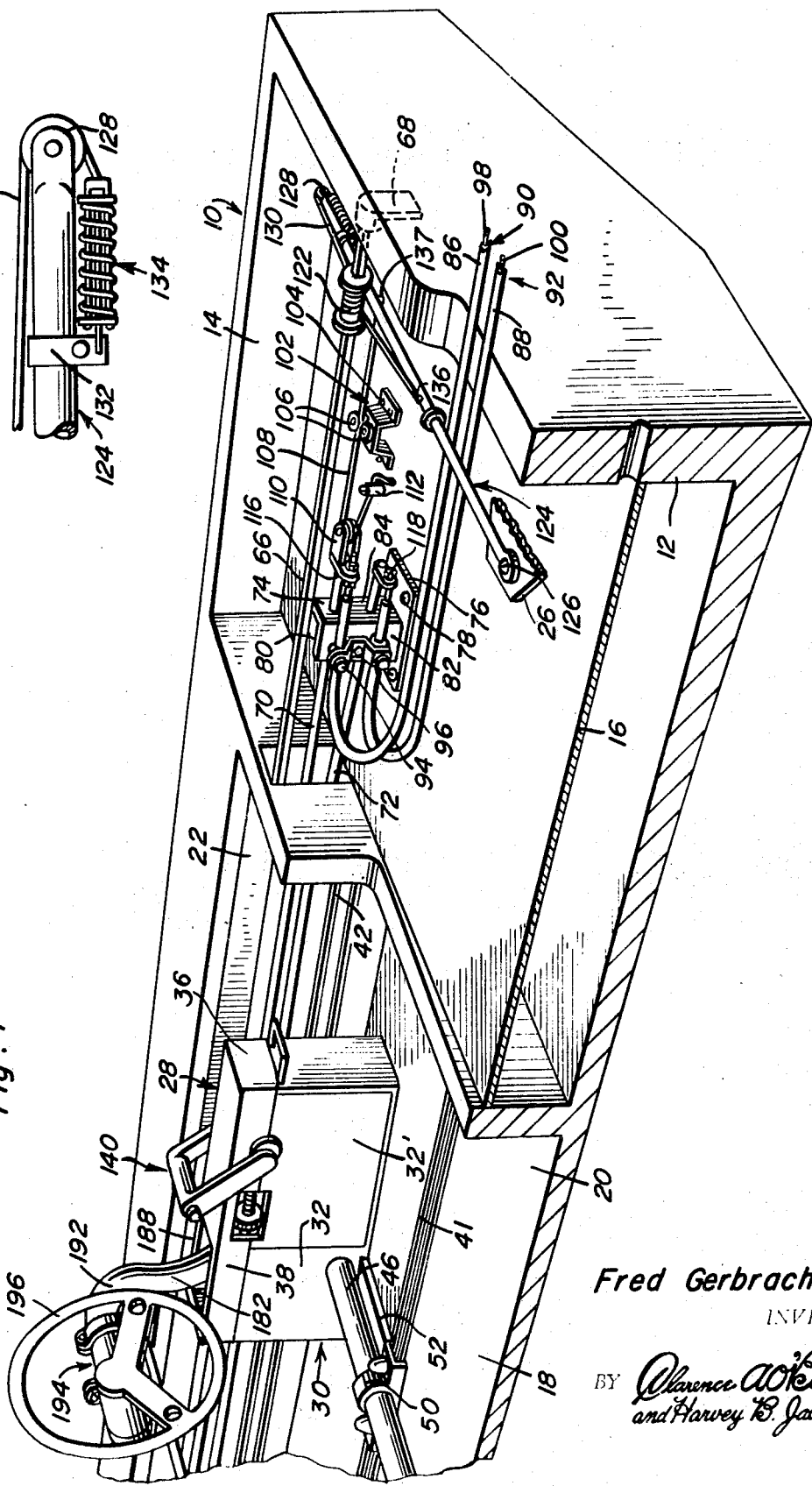

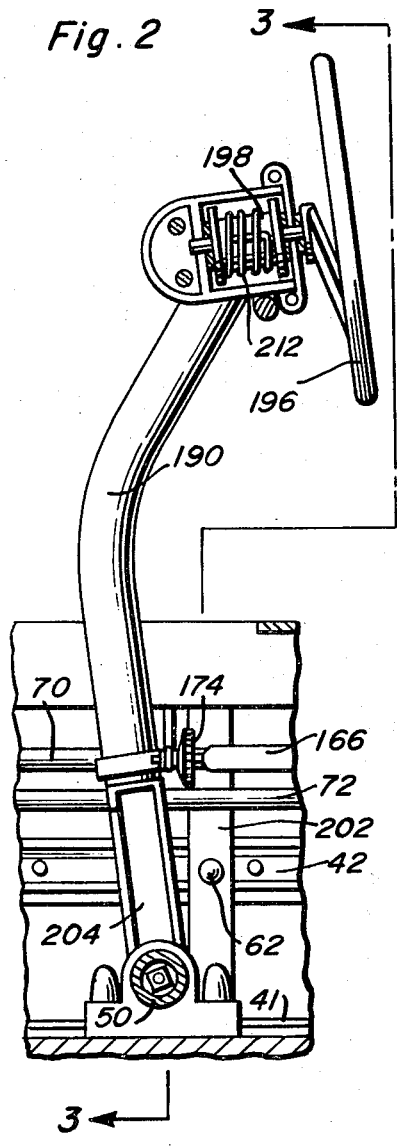
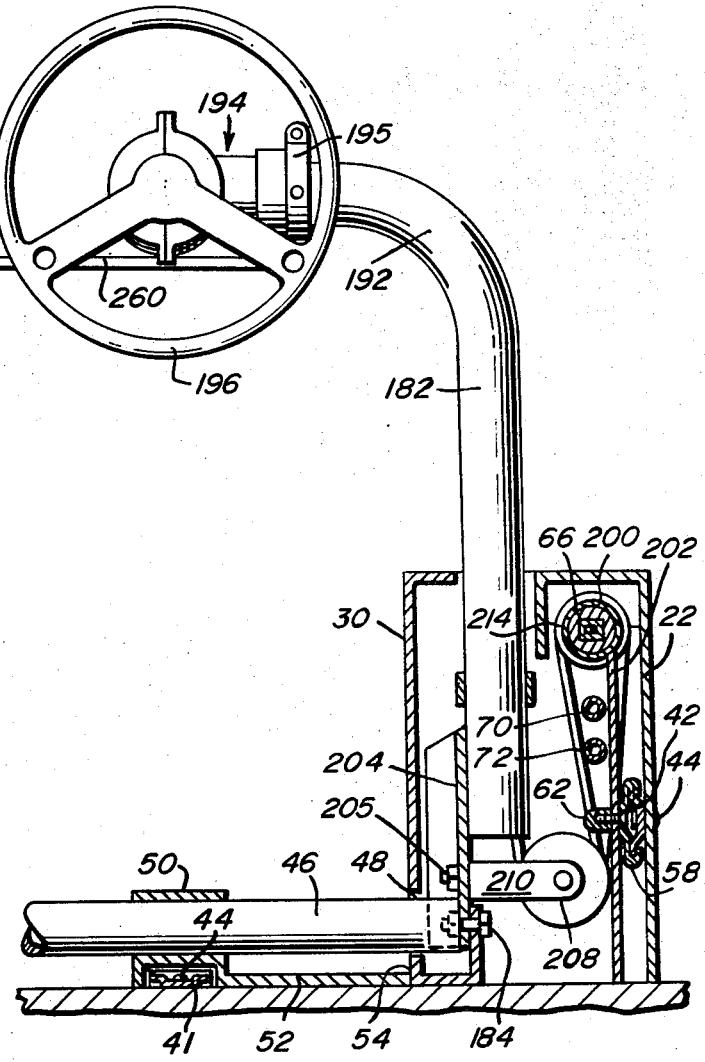
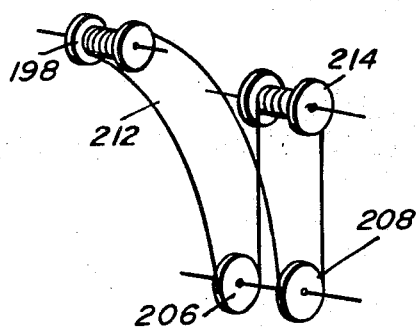
Fred Gerbracht
INVENTOR.

PATENTED SEP 5 1972　　3,688,727

Fred Gerbracht
INVENTOR.

BY *Clarence A. O'Brien*
*and Harvey B. Jacobson*
Attorneys

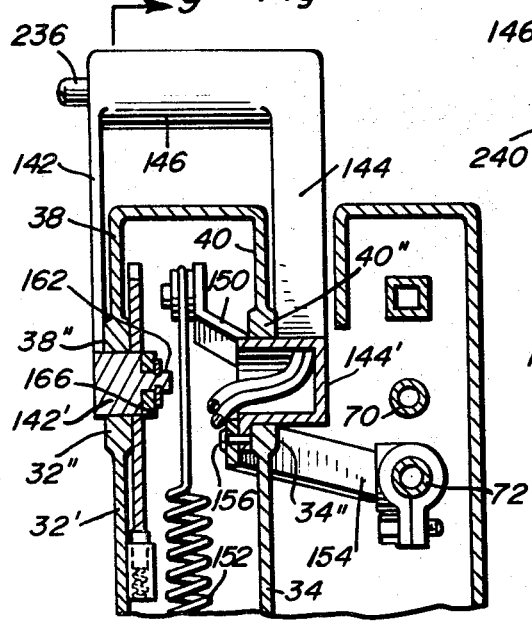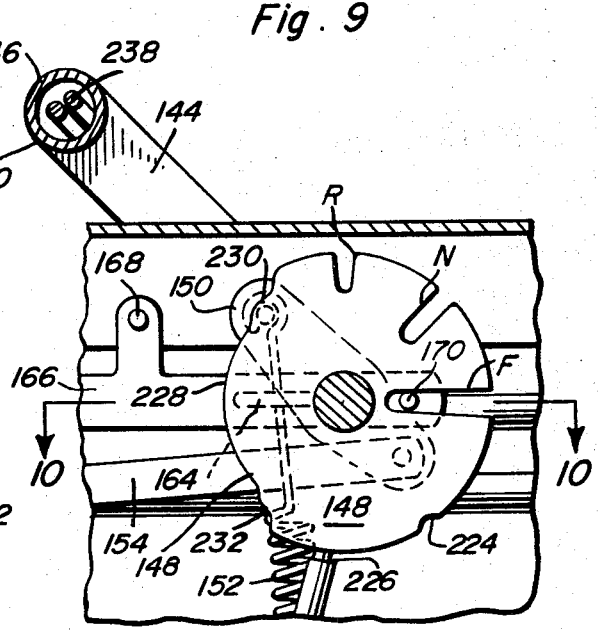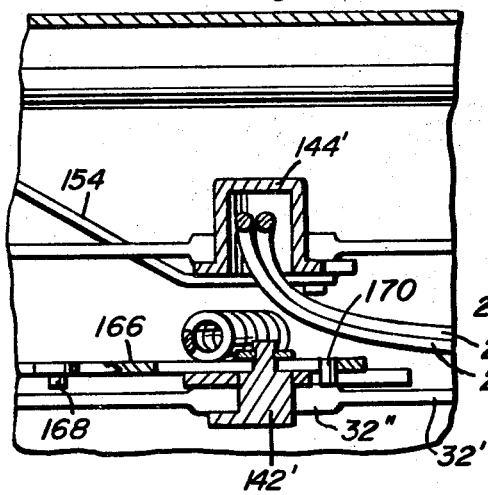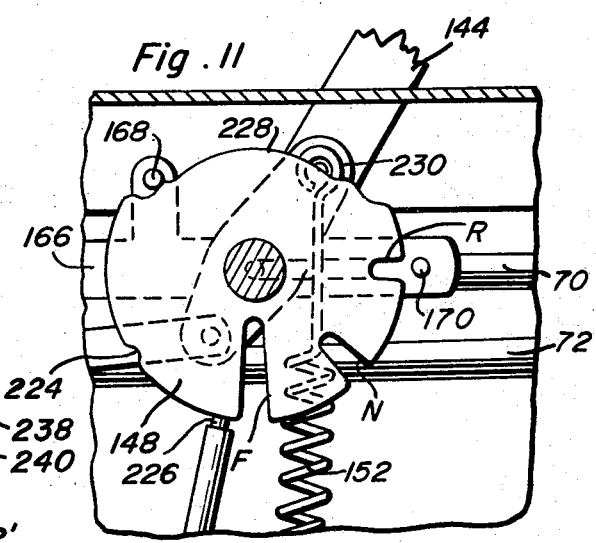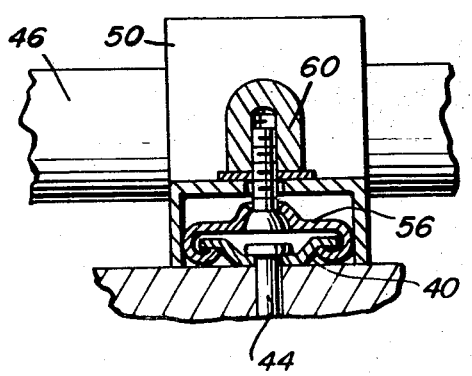

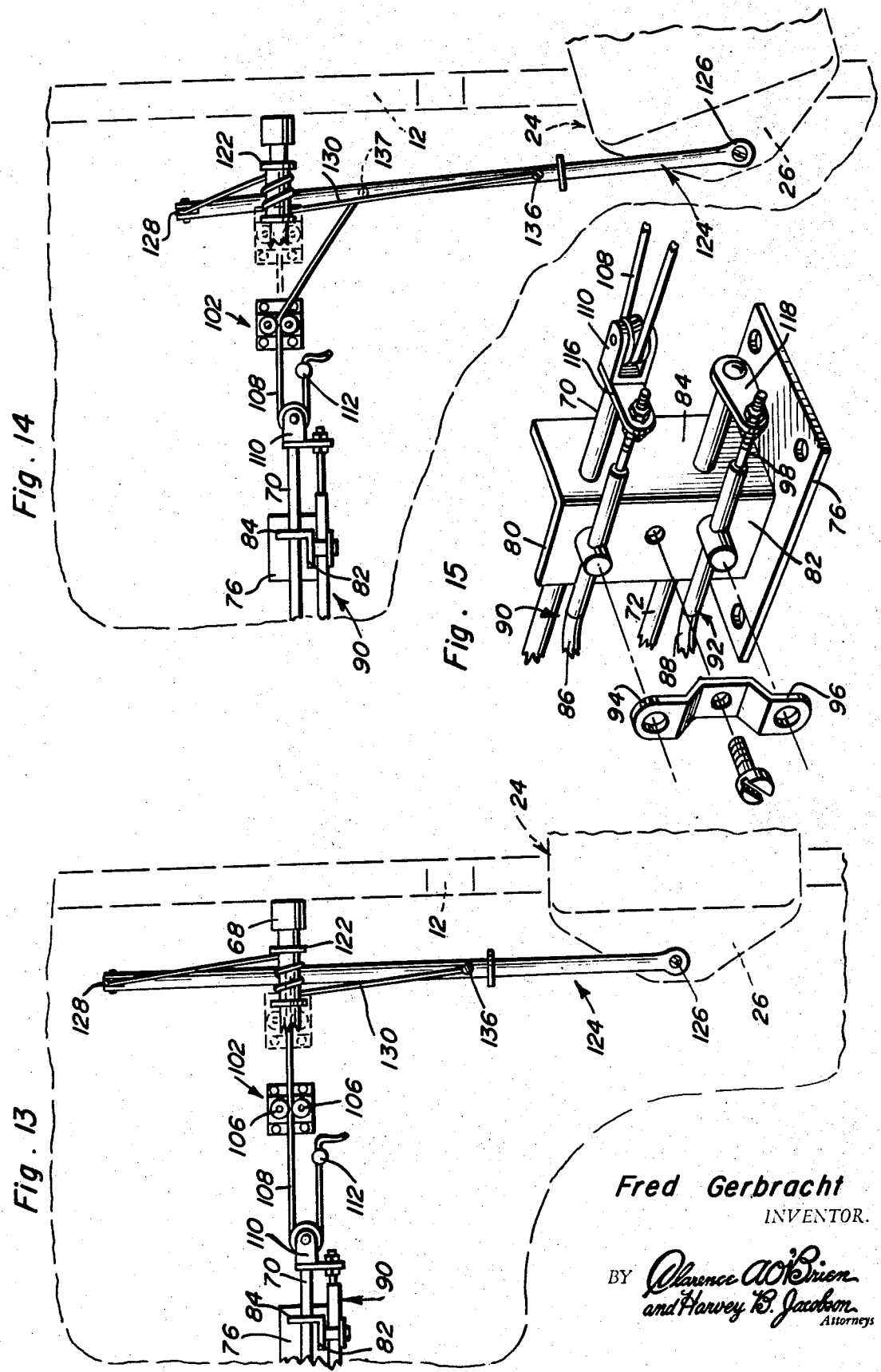

STEERING, ENGINE AND TRANSMISSION CONTROL FOR BOATS

It is generally considered a rule in sailing that one hand is for the ship and the other hand is for the sailor, and most sailboats can be crewed accordingly. However, motorboats are generally operated by one person. Each year the industry provides faster, more seaworthy boats, equipped with more powerful and reliable propulsion units than ever before and as a result more people are cruising faster and farther and venturing into rougher waters.

Currently, a hull manufacturer will supply a steering wheel to be mounted on a console or dashboard and steering linkage while the motor manufacturer provides a throttle control to be possibly combined with a shift control and known as a "single lever control" to be mounted near the steering wheel. In order to change power and speed the operator has to take one hand from the wheel and reach for the throttle. If the operator of a boat is traveling in rough water, he tries to find a throttle setting somewhere between a high speed setting which results in a rough and wet ride and a slower speed setting below the speed at which the boat planes which results in the boat rolling and pitching. On the other hand, a boat operator will sometimes repeatedly change the throttle setting while simultaneously turning the wheel to avoid the highest crests and deepest troughs in trying to obtain a pleasant ride for his passengers but at the expense of a tiring effort on his part.

Boat and engine manufacturers, dealers, mechanics and the buyer of a boat mount the controls to start and stop an engine as well as various gauges, switches, lights, the compass and other devices in no particular order. For this reason, an operator needs considerable time to become accustomed to any given boat and finds many boats awkward by day and dangerous by night to operate. Accordingly, persons who operate boats would welcome a somewhat standardized control and instrumentation system. Certainly, a mechanic could lay out and secure more reliable wiring, fuel connections, indicator circuits and the like if provided with a standardized steering and control console such as that included in the instant invention thereby lessening the possibility of malfunctions in the future.

Single stick controls have been proposed in the past for low powered motors but they lacked sufficient mechanical advantage to steer modern runabouts which are provided with in excess of 100 horsepower, unless provided with power boosting means.

Further, control consoles which are provided in some runabouts are usually attached to or built into the boat in an immovable manner and intended for some particular service, such as trolling off the stern or casting off the foredeck. Further, a control console is sometimes placed amidships in a sort of general purpose location. Considering the wide range of services that the small boat might perform, there is really no single optimum location for a standardized control console.

Also, there are presently no interlocks or coordinating mechanisms that combat all of the problems arising from throttle or speed control regulation in its relationship to the gear shift and steering setting. Cold engines idle too slowly and tend to stall, especially just after being shifted into gear, and hot engines may idle too fast and provoke undue wear on their shifting gear. Still further, when operating a boat being utilized in water skiing, it is difficult for the operator of the boat to keep a sufficient watch ahead of the boat while getting a skier up and compensating for the inherent tendency of a single engine runabout to yaw when the throttle is suddenly opened. Further, a boat provided with sufficient power to be considered a fast boat under ideal boating conditions may prove dangerous to the less experienced persons of a family.

A primary object of this invention is to provide in one single cruising control mechanism a steering wheel mounted on an oscillatable column linked to the engine throttle control so that the operator can cruise his boat by immediate and natural responses involving a push on the column to go faster and a pull back on the column to slow down while simultaneously steering either to the right or left.

Another important object of this invention is to provide a steering wheel in accordance with the immediately preceding object and mounted directly in front of the operator's position in the boat with no parts exposed to be snagged by the operator or his clothing and with an integral portion of the cruising control mechanism providing a footrest for the operator of the boat.

Another object of this invention is to provide a cruising control mechanism in accordance with the preceding objects and including a primary movable control member which may be engaged either by one hand or both hands of the operator and utilized not only to steer the boat but also to control the throttle setting of the associated engine or engines, thereby enabling the boat to be under improved control by the operator for instant change of throttle and steering controls as deemed necessary.

An ancillary object of this invention is to provide a cruising control mechanism including a throttle portion constructed in a manner to be readily maintained under control of a rearwardly facing observer in the associated boat whereby the throttle may be quickly closed in the event a water skier being towed behind the boat falls.

Another very important object of this invention is to provide a cruising control mechanism in accordance with the preceding objects and including structural features thereof, enabling the control console thereof to be readily adjustably shifted along the side of an associated boat whereby steering and engine control changes may be effected either from a forward position, a stern position, or a midships position. This object is accomplished by providing control shafts or rods along the full length of the cockpit of the associated boat and with tracks to secure the console within the boat in a manner such that the console may be shifted longitudinally therealong. If the boat is to be used without a motor for a swimming platform, or with a sail and small auxiliary motor, or left unattended for some time, then the console and instruments may be removed and left in storage for safekeeping inasmuch as the console is readily removable from the boat.

Assuming that a boat is designed to be utilized in conjunction with the control console of the instant invention, by providing the console with a magnetic compass, clinometer bubbles and other guidance instruments, the console may be further utilized in maintaining proper trim and guidance of the boat and these additional instruments may be mounted on the console in invariable relationship to the centerline of the boat. Further, these additional instruments will always be maintained in the same orientation relative to the steering, throttle and shift controls of the boat and therefore may be readily used by the operator of the boat.

Compared to an automobile operator, the boat operator is faced with several disadvantages. The boat operator seldom operates his boat daily and does not therefore stay very familiar with his boat's behavior inasmuch as each time an operator takes his boat out he may carry a different load under different sea conditions. Consequently, it is a further object of this invention to provide several linkages of the control console that cooperate with each other to some degree and serve to interlock or coordinate the settings and changes in all of the principal controls so that the operator will have less to worry about and will make fewer mistakes.

Still another object of this invention is to provide a means of readily changing the idle adjustment of the associated engine from the control console thereby enabling the idle adjustment to be readily slightly increased when the motor is cold to avoid misfiring and stalling and sufficiently reduced when the motor is hot to permit smooth engagement of the gear shift.

Another object of this invention is to provide a control console with throttle, steering and gear shift controls including the usual safety factors whereby the throttle opening is limited when the associated engine is in idle or in the reverse gear position.

Still another object of this invention, in accordance with the immediately preceding object, is to provide a control console also including an interlock between the steering and throttle settings whereby the opening of the associated motor throttle will be progressively limited as the steering control is turned further from the straight ahead position.

Another object of this invention is to provide a control console including interlock means between the shift and throttle controls which will not allow a change in the gear setting when the throttle is advanced above the idle position and which will not allow the throttle control to be increased beyond the idle setting when the gear shift control is disposed between predetermined positions in which the associated transmission is in, either forward, neutral or reverse.

Another important object of this invention is to provide a means whereby a control console including an interconnection between the throttle and steering controls is provided whereby initial movement of the throttle control to the full open position will apply a slight steering control designed to offset the tendency of the boat to yaw when initially accelerating under full throttle.

Still another object of this invention is to provide a steering console including an adjustable interlock between the throttle and steering controls whereby the maximum throttle setting possible is progressively reduced as the steering wheel is turned from a dead ahead position.

A further object of this invention is to provide a boat control mechanism that employs mostly rigid push-pull or turning shaft controls which have been long recognized to be of the more reliable types under all conditions and which also enable the use of quick disconnect features enabling the helmsman to make quick repairs, when needed, and to by-pass certain components should some parts of the control become inoperative.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary perspective view of a runabout type of motorboat shown with the control console of the instant invention operatively mounted therein;

FIG. 2 is a fragmentary enlarged longitudinal vertical sectional view taken substantially upon a plane passing through the axis of rotation of the steering wheel;

FIG. 3 is a fragmentary transverse vertical sectional view taken substantially upon the plane indicated by the section line 3—3 of FIG. 2;

FIG. 4 is a schematic perspective view illustrating the reeving of the steering cables of the control console;

FIG. 8 is a fragmentary enlarged transverse vertical sectional view of the upper portion of the console taken substantially upon a plane passing through the axis of oscillation of the gear shift control handle;

FIG. 9 is a fragmentary longitudinal vertical sectional view taken substantially upon the plane indicated by the section line 9—9 of FIG. 8 and illustrating the gear shift control in the forward gear position;

FIG. 10 is a fragmentary horizontal sectional view taken substantially upon the plane indicated by the section line 10—10 of FIG. 9;

FIG. 11 is a fragmentary longitudinal vertical sectional view similar to FIG. 9 but illustrating the gear shift control in the reverse gear position and with the throttle closed;

FIG. 12 is a fragmentary enlarged transverse vertical sectional view illustrating the manner in which the lower transverse shaft portion of the console is slidably supported from a track extending longitudinally of the associated cockpit floor;

FIG. 13 is a fragmentary top plan view of the rear portion of the control system illustrating the manner in which the steering control is operatively connected to an associated outboard motor;

FIG. 14 is a plan view similar to FIG. 13 but with the associated motor illustrated in a position to effect a turn of the corresponding boat to starboard;

FIG. 15 is an exploded perspective view of the rear support for the throttle and shift controls of the control console; and FIG. 16 is a fragmentary enlarged rear elevational view of the bow connection between the steering spindle and associated outboard motor.

Figure 5:
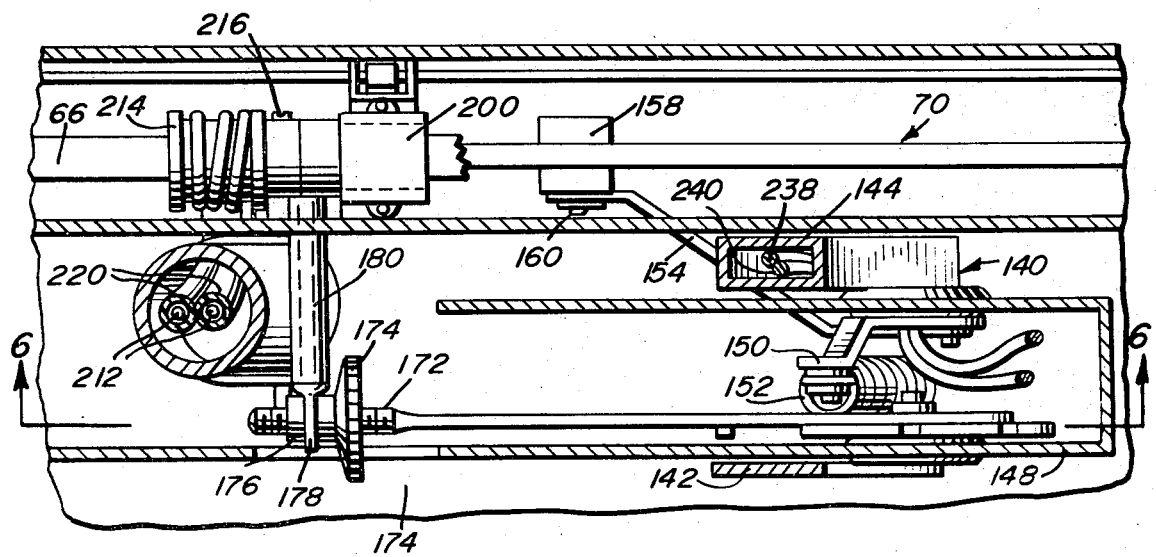
FIG. 5 is a fragmentary enlarged horizontal sectional view taken substantially upon a plane passing through the upper portion of the steering console illustrated in FIG. 1.
Figure 6:
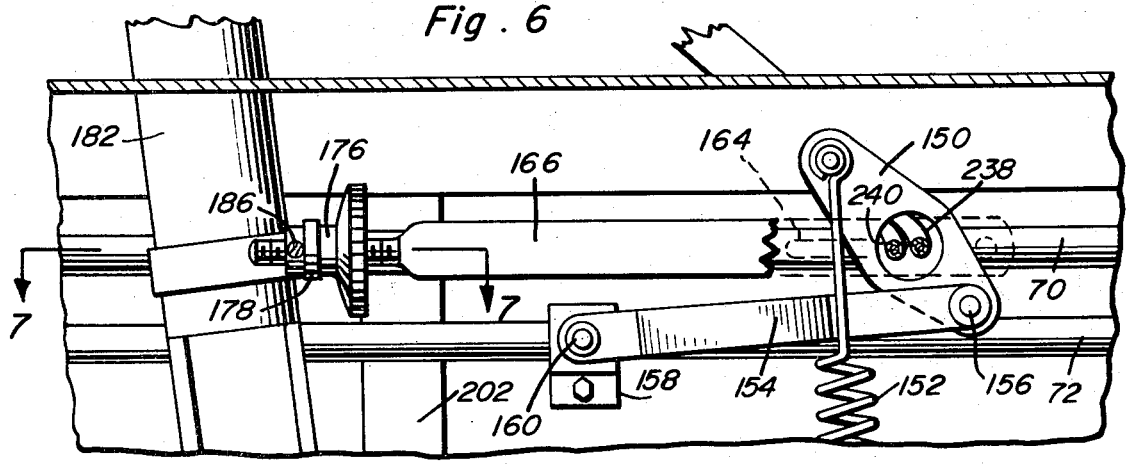
FIG. 6 is a fragmentary longitudinal vertical sectional view taken substantially upon the plane indicated by the section line 6—6 of FIG. 5.
Figure 7:
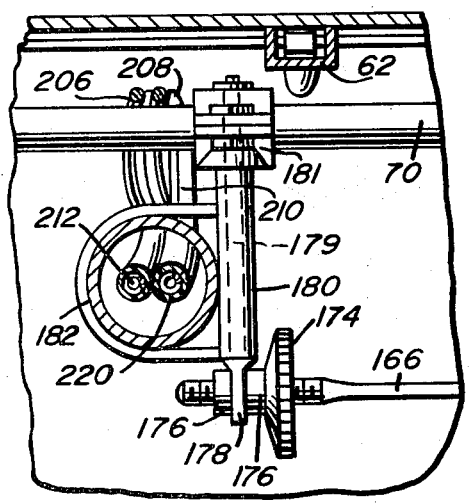
FIG. 7 is a fragmentary horizontal sectional view taken substantially upon the plane indicated by the section line 7—7 of FIG. 6.

Referring now more specifically to the drawings, the numeral 10 generally designates a conventional form of outboard runabout boat including a transom 12, an outboard motor well 14 disposed immediately forward of the transom 12 and including a bottom wall 16, a cockpit 18 including a floor 20 and a starboard side wall 22. An outboard motor, see FIGS. 13 and 14, generally referred to by the reference numeral 24 is supported from the transom 12 in the usual manner and the outboard motor includes a forwardly projecting mounting portion 26 to which conventional steering controls may be attached. In addition, the outboard motor includes throttle and gear shift controls (not shown) to which further reference will be made hereinafter.

The control mechanism of the instant invention is referred to in general by the reference numeral 28 and includes a control console 30. The console defines a hollow housing provided with inner and outer side walls 32 and 34 and a removable top wall or cover 36 including depending inner and outer side wall portions 38 and 40, see FIG. 8.

A pair of slide tracks 41 and 42 are secured to the cockpit flooring 20 and the side wall 22 by means of fasteners 44 and the control console 30 includes a horizontally inwardly projecting shaft 46 which passes through an opening 48 in the lower forward marginal portion of the side wall 32 and the end of the shaft 46 remote from the side wall 32 is journalled through a support 50 carried by the outer end of an arm 52 which also projects inwardly from and is secured to the side wall 32 of the console 30 by welding 54. The support 50 includes guide structure 56 slidingly and guidingly engaged with the slide track 41 and the console 30 further includes a guide structure 58 slidingly and guidingly engaged with the slide track 42. The guide structures 56 and 58 include threaded nuts 60 and 62, respectively, which may be tightened in order to frictionally retain the guide structures 56 and 58 in position along the slide tracks 41 and 42. Thus, the console 30 and shaft 46 may be readily shifted longitudinally of the cockpit 18. Of course, the arm 52 could be provided with a set of bores registerable with with a plurality of sets of corresponding bores formed in the flooring 20 at points spaced longitudinally therealong for adjustable securement of the arm 52 to the flooring 20 by fasteners (not shown) in lieu of the track 41.

The control mechanism further includes an elongated non-circular steering control tubular member 66 whose rear end is journaled from the transom 12 by means of a journal block 68 and whose forward end is journaled from a forward portion of the boat 10 by means of a similar journal block (not shown). A pair of throttle and shift control rods 70 and 72 are also provided and supported for longitudinal reciprocation along the boat 10. The rear ends of the rods 70 and 72 are slidingly supported from a suitable anchor assembly referred to in general by the reference numeral 74 and the forward ends of the rods 72 are supported for reciprocation relative to the boat 10 by means of a similar forwardly disposed anchor assembly (not shown). Therefore, the tubular member 66 may be rotated as desired and the rods 70 and 72 may be shifted longitudinally of the boat 10, see FIG. 15.

The anchor assembly 74 includes a base plate 76 secured to the bottom wall 16 of the outboard motor well 14 by means of suitable fasteners 78 and an upstanding angle iron 80 including an upright longitudinal flange 82 and an upright transverse flange 84. The rear ends of the rods 70 and 72 are slidably received through apertures provided therefor in the flange 84 and corresponding ends of the outer housings 86 and 88 of a pair of flexible cable assemblies generally referred to by the reference numerals 90 and 92, respectively, are supported from the flange 82 by means of clamp assemblies 94 and 96. The cable assemblies 90 and 92 include flexible inner core members 98 and 100 which are longitudinally shiftable in the outer housings 86 and 88, respectively, according to common practice.

A second anchor assembly referred to in general by the reference numeral 102 is supported from the bottom wall 16 of the outboard motor well 14 by means of fasteners 104 and the anchor assembly 102 includes a pair of closely radially spaced apart grooved wheels 106 journaled for rotation about upstanding axes and between which an elongated flexible pull member 108 extends.

The rear end of the rod 70 has a pulley assembly 110 mounted thereon about which a forward end of the pull member 108 is trained and the forward terminal end portion of the pull member 108 is anchored to the bottom wall 16 by means of an anchor 112 supported from the bottom wall 16 and through which the free terminal end portion of the pull member 108 extends. The anchor 112 includes clamp means whereby predetermined longitudinally spaced portions of the pull member 108 may be secured thereto.

The pulley assembly 110 includes an apertured mounting ear portion 116 to which the adjacent end of the flexible inner cable member 98 is secured and the rear end of the rod 72 includes a laterally directed arm 118 to which the adjacent end of the inner flexible cable member 100 is secured. Of course, the inner cable members 98 and 100 are operatively connected to the throttle and shift controls (not shown) of the outboard motor 24 in the usual manner whereby reciprocation of the rods 70 and 72 will be operable to change the throttle setting of the outboard motor 24 and change the gear transmission of the outboard motor 24.

The flexible inner cable member 98 is connected to the throttle control (not shown) of the outboard motor 24 in a manner such that forward shifting of the rod 70 serves to open the throttle of the outboard motor 24.

The rear end portion of the tubular member 66 has a winding drum or spool 122 mounted thereon for rotation therewith and a steering bow referred to in general by the reference numeral 124 has one end thereof pivotally secured to the portion 26 by means of a pivot fastener 126. The other end of the bow 124 has a pulley wheel 128 journaled therefrom and an elongated flexible tension member 130 is provided and has one end thereof anchored to the bow 124 by means of a clamp assembly 132 and tensioning assembly 134. The tension member 130 is trained over the pulley wheel 128 and passed about the winding member or spool 122 several times and has its end remote from the tensioning assembly 134 anchored to the steering bow 124 as at 136. Also, the free end of pull member 108 is anchored to the bow 124 at 137. Accordingly, a rotation of the tubular member 66 will cause rotation of the winding member or sleeve 122 and thus the steering bow 124 to be longitudinally shifted so as to pivot the outboard motor 24, see FIGS. 13 and 14.

The console 30 includes a section 32' of the side wall 32 which is removably supported from the remainder of the console 30 in any convenient manner (not shown) so as to provide access to the interior of the console 30. A generally U-shaped handle referred to in general by the reference numeral 140 is oscillatably supported from half bearing journals 32'', 34'', 38'', and 40'' formed in the wall portions 32', 34, 38 and 40. The U-shaped handle 140 includes a pair of generally parallel legs 142 and 144 interconnected at their upper ends by means of a handgrip defining bight portion 146 and the free ends of the legs 142 and 144 include pin portions 142' and 144' journaled from the aforementioned half journal blocks. The pin portion 142' has a sector disc 148 fixedly mounted thereon within the console 30 for rotation therewith and the inner end of the pivot pin 144' has a double-ended lever arm 150 formed integrally therewith. One end of the lever arm 150 has a hooked end of a tension spring 152 secured thereto and the other end of the lever arm 150 has one end of a connecting rod 154 pivotally secured thereto as at 156. The other end of the connecting rod 154 is pivotally secured to a clamp block 158 as at 160 and the clamp block 158 is mounted on the rod 72 and may be loosened, shifted longitudinally of the rod 72 and again tightened so as to be secured in adjusted position on the rod 72.

The inner end of the pin 142' includes a diametrically reduced terminal end 162 secured through an elongated slot 164 in a second connecting rod 166 including first and second laterally projecting abutment pins 168 and 170. The end of the connecting rod 166 remote from the slot 164 is externally threaded as at 172 and has a thumb wheel 174 threaded thereon. The thumb wheel 174 includes a diametrically reduced sleeve portion 176 journaled through an eye bracket 178 which in turn has a shank portion 179 journaled through a transverse sleeve 180 clamped to an upright tubular support 182 whose lower end is rigidly attached to the outboard end of the shaft 46, the latter shaft end being rotatably anchored to the console 30 by means of a pivot fastener 184. Further, the outboard end of the sleeve 180 includes a clamp 181 adjustably positionable along the rod 70, whereby forward movement of the upper end of the support 182 will cause forward movement of the rod 70. The sleeve portion 176 includes a setscrew 186 which may be adjusted so as to create a friction drag against rotation of the thumb wheel 174 relative to the externally threaded forward end portion 172 of the connecting rod 166.

The portion of the tubular support 182 spaced above the clamp from which the sleeve 180 is supported passes through a slot 188 formed in the top wall or cover 36 and the upper end portion of the tubular support 182 curves rearwardly as at 190 and inwardly as at 192. The terminal end of the inwardly curving upper end of the tubular support 182 has a steering wheel housing referred to in general by the reference numeral 194 journaled thereon for rotation as well as axial shifting therealong and is frictionally retained in adjusted position by means of a clamp assembly 195. The housing 194 is oscillatable through an arc of generally 180° and the housing 194 has a steering wheel 196 journaled therefrom and including a winding drum portion 198 rotatable therewith and disposed within the housing 194. Accordingly, the axis of rotation of the steering wheel 196 and winding drum portion 198 may be adjusted, upon oscillation of the housing 194, from a first horizontal position through a substantially vertical position and thereafter to a reversed horizontal position, whereby the helmsman may be standing or seated so as to face either forward or rearward.

The tubular member 66 is also journaled intermediate its opposite ends by means of a journal block 200. The journal block 200 is carried by the upper end of a support arm 202 from which the nut 62 is supported and accordingly, the journal block 200 is shifted longitudinally of the tubular member 66 whenever the console 30 and shaft 46 are shifted longitudinally of the boat 10.

The pivot fastener 184 is secured through a mounting plate portion 204 carried by the lower end of the tubular support 182 and the mounting plate portion 204 is disposed upright in a plane extending longitudinally of the boat 10 and has the outer end of the shaft 46 welded thereto. A pair of front and rear pulley wheels 206 and 208 are journaled from similar supports 210 carried by the mounting plate portion 204 and the opposite end portions of a flexible cable 212 are wound about a winding drum 214 secured in fixed position along the tubular member 66 by means of a setscrew 216. The end portions of the cable 212 pass beneath the pulley wheels 206 and 208 and up through the lower end of the tubular support 182 while the midportion of the cable 212 is wound about the winding drum portion 198. Those portions of the cable 212 extending through the tubular support 182 are loosely engaged within flexible and resilient tubular sleeves 220 for protection and to prevent the cable 212 from rattling against the inside surfaces of the tubular support 182.

As can best be seen in FIGS. 2 and 3 of the drawings, the portion of the housing 194 in which the winding drum portion 198 is journaled is composed of two half sections removably joined together and accordingly, access may be had to the winding drum portion 198.

With attention now invited more specifically to FIGS. 9 through 11 of the drawings, it may be seen that the disc 148 is generally circular and provided with three generally radial slots F, N and R in which the second abutment pin 170 is receivable in different rotated positions of the disc 148.

The disc 148 also includes a peripheral notch 224 in which a spring-urged detent 226 supported from the side wall 32 is receivable when the slot N is registered horizontally with the first abutment pin 170. Still further, the disc 148 includes an arcuate outer peripheral surface portion 228 whose opposite ends terminate in radially outwardly displaced ramps 230 and 232 with which the abutment pin 168 is engageable when the slots F and R, respectively, are registered horizontally with the abutment pin 170. Further, the bight portion 146 of the handle 140 encloses a push button starter switch (not shown) including a push type actuator 236. The push button switch has a pair of electrical conductors 238 and 240 electrically connected thereto and the ends of the conductors 238 and 240 remote from the switch enclosed within the bight portion 146 may be electrically connected to the starter actuating circuit of the outboard motor 24.

It may be noted from a comparison of FIGS. 9 and 11 that the expansion spring 152 will be disposed in a maximum stretched center position when the notch N is horizontally registered with the abutment pin 170. Accordingly, the expansion spring 152 serves to maintain the handle 140 in either the position thereof illustrated in FIG. 9 of the drawings with the slot F registered with the pin 170 or the position thereof illustrated in FIG. 11 of the drawings with the slot R registered with the pin 170. Of course, the detent 226 is disposed in the notch 224 when the notch N is registered with the pin 170 and the detent 226 therefore serves to releasably retain the handle 140 in a vertical position.

In operation, the outboard motor 24 is initially started by positioning the handle 140 in a vertical position with the slot N registered with the abutment pin 170. Then, the tubular support 182 is inclined forwardly to increase the throttle opening. Forward inclining of the upper end of the tubular support 182 will effect a forward pull on the connecting rod 166 to displace the latter forwardly until the abutment pin 170 abuts the inner end of the notch N. Thereafter, after the ignition switch (not shown) has been turned on, the actuator 236 on the handle 140 may be depressed by the thumb in order to actuate the starter (not shown) of the outboard motor 24. After the engine has been started, the actuator 136 is of course released and the motor 26 may be allowed to warm up, at least initially, before the upper end of the tubular support 182 is swung rearwardly to close the throttle toward the idle position. As the tubular support 182 is swung rearwardly at its upper end, the connecting rod 166 is shifted rearwardly until the abutment pin 168 engages the central portion of the peripheral segment 228 of the disc 148. Thus, the abutment pin 168 defines the idle position of the throttle as it contacts the peripheral portion 228. However, if it is a cold day when the motor 26 is started, and it is thought that the engine or motor 26 might not idle properly unless the idle throttle setting is increased, the thumb wheel 174 may be engaged and turned so as to increase the effective length of the connecting rod 166 and thereby increase the idle throttle setting as determined by the abutment pin 168.

When it is desired to place the outboard motor 24 in forward gear, the handle 140 is pivoted to the position thereof illustrated in FIG. 9 of the drawings with the slot F horizontally registered with the abutment pin 170. Then, the upper end of the tubular support 182 may be shifted forwardly so as to also forwardly shift the connecting rod 166 and thus the throttle control rod 70.

It will of course be noted that when the throttle rod 70 is in the idle position, the abutment pin 170 is spaced rearward of the rear peripheral portions of the disc 148 whereby the disc 148 is free to be turned upon oscillation of the handle 140. However, after the throttle rod 70 has been initially shifted forwardly, the abutment pin 170 is received in the corresponding slot formed in the disc 148 and thus rotation of the disc 148 is prevented until the throttle setting is reduced.

When it is desired to go from forward gear to reverse gear it is therefore necessary to initially pull back on the upper end of the tubular support 182 in order to close the throttle and displace the abutment pin 170 rearwardly out of the slot F. Thereafter, the handle 140 may be oscillated from the position thereof illustrated in FIG. 9 of the drawings to the position thereof illustrated in FIG. 11 of the drawings with the abutment pin 170 registered with the slot R. Then, the upper end of the tubular support 182 may again be displaced forwardly so as to increase the throttle setting, Of course, the connection between the lever arm 150 and the shift control rod 72 defined by the connecting rod 154 ensures that the transmission of the outboard motor 24 will be disposed in neutral when the slot N is registered with the abutment pin 170, in forward gear when the slot F is registered with the abutment pin 170 and in reverse gear when the slot R is registered with the abutment pin 170. In addition, as hereinbefore set forth, the expansion spring 152 serves to yieldably retain the disc 148 in either the reverse gear position or the forward gear position and the detent 226 serves to yieldably retain the disc 148 in the neutral gear position with the slot N registered with the abutment pin 170.

It will be noted that the slot F is appreciably longer than the slots N and R and it will further be noted that the inner ends of the slots N and R limit the amount the throttle setting may be increased. This of course will prevent destructive overspeeding of the outboard motor 24 in neutral and the boat 10 from proceeding in reverse at a speed which might cause water to be taken into the boat 10 over the upper marginal portion of the transom 12.

The console 30 may of course be shifted longitudinally of the boat 10 to any desired position therein merely by loosening the fasteners 60 and 62, the setscrew 216 and the clamp body 158. Then, the control console 30 may be shifted to the position desired after which the fasteners 60 and 62, the setscrew 216 and the clamp block 58 may be again tightened.

Assuming now that the handle 140 is in the position thereof illustrated in FIG. 9 of the drawings and that the throttle setting is increased only slightly above the idle setting, rapid forward movement of the upper end of the tubular support 182 will cause the boat 10 to accelerate at high speed. However, when a boat is rapidly accelerated, the rear end of the boat, unless equipped with counter-rotating dual propellers, tends to yaw in one direction, which directions depends upon the direction of rotation of the propeller driven by the outboard motor 24. This yawing is commonly referred to as "torquing" and is offset by the control mechanism 28 of the instant invention in that the pulley wheels 206 and 208 about which the opposite end portions of the cable 212 are trained, compensate for this "torquing" action. Inasmuch as the pulley wheels 206 and 208 are spaced apart longitudinally of the boat 10, as the tubular support 182 is pushed forward at its upper end, the pulley 208 is slightly elevated and the pulley 206 is slightly downwardly depressed whereupon the end portion of the cable 212 passing about the pulley 208 and attached to the winding member or drum 214 is increased in effective length and the end portion of the cable 212 passing about the pulley 206 is decreased in effective length. This will of course cause a slight steering control to be applied to the outboard motor 24 independent of rotation of the steering wheel 196. When the proper end portions of the cable 212 are passed over the wheels 206 and 208, the aforementioned "torquing" action may therefore be offset.

When the steering wheel 196 is turned, the winding member or spool 214 and tubular member 66 are also turned. Thus, the winding member or spool 122 is turned and the steering bow 24 is shifted longitudinally so as to swing the mounting portion 26 of the outboard motor 24 about the upstanding axis of oscillation of the outboard motor 24.

With attention now invited more specifically to FIG. 13 of the drawings, it will be noted that the end portion of the pull member 108 anchored as at 136 to the steering bow 124 extends from the wheels 106 directly rearwardly when the outboard motor 24 is positioned in the dead ahead position. However, when the outboard motor 24 is turned to either side of a dead ahead position, the rear end portion of the pull member 108 is deflected in the manner illustrated in FIG. 14 thereby causing a rearward pull on the pulley assembly 110 and the throttle control rod 70 upon which the pulley assembly 110 is mounted. Accordingly, assuming that the boat 10 is being operated in forward gear at maximum throttle setting and speed, as the steering wheel is turned in order to turn the outboard motor from the phantom line position thereof illustrated in FIG. 13 of the drawings to the phantom line position thereof illustrated in FIG. 14 of the drawings, the steering bow 124 will be shifted from the position of FIG. 13 to the position of FIG. 14 so as to laterally deflect the rear end portion of the pull member 108 and exert a rearward pull on the throttle control rod 70. This of course will at least slightly close the throttle setting from a full open position and result in the power output of the outboard motor 24 being reduced whenever the boat 10 executes a turn. Further, the sharper the turn executed by the boat 10 the more the throttle setting is reduced.

The amount of reduction of the throttle setting determined by a given turn being executed by the boat 10 may be determined by the adjustment of the end portion of the pull member 108 relative to the abutment 112. Further, the anchor assembly 102 may be shifted in position longitudinally of the boat 10 to also vary the amount the throttle setting will be reduced in response to the boat 10 executing a given turn.

Inasmuch as the section or portion 32' of the side wall 32 is removable and the top wall or cover 36 of the control console 30 is removable, access to the varios operating components of the invention disposed within the control console 30 may be readily gained. In addition, the control mechanism 28 is adapted to be utilized in conjunction with existing flexible control cables such as cables 90 and 92 and with a conventional mounting portion 26 of the outboard motor 24 which is utilized for steering purposes. Therefore, the control mechanism 28 may be utilized in conjunction with substantially any outboard motor and it is believed that it will further be readily appreciated that the control mechanism 28 could be readily mounted in substantially any type of boat.

In addition, the more complicated working components of the control mechanism 28 are enclosed within or supported from the control console 30 with only the rods 70 and 72 as well as the tubular members 66 exposed and extending longitudinally of the boat 10. Thus, there is little possibility of equipment or persons within the boat interfering with the operation of the control mechanism.

The control of the instant invention can be used either in conjunction with an outboard drive unit or an outboard motor. Further, the throttle controlling portions of the instant invention may be used to control the "throttle" of various types of motive sources such as gasoline, diesel, or steam engines and the like.

Further, a horizontally projecting handle 260 is provided and carried by the housing 194 and may be grasped by a rearwardly facing observer when the boat 10 is being used to pull water skiers, whereby control of the throttle may be undertaken by the observer to immediately close the throttle should a water skier fall by pushing rearwardly on the handle 260.

If the various shifting mechanisms of the transmissions with which the instant invention is to be used offer more than minimum resistance to changes in the positioning of the actuators therefor, additional springs may be used with the spring 152. Also, the points of attachment of the spring 152 and supplemental springs may be angularly adjustable relative to the disc 148 in order to insure that the spring or springs will function to retain the shift control firmly in the various gear positions thereof.

The proper tensioning of the cable 212 may be obtained by loosening the clamp 195 and shifting the housing 194 along the horizontal transverse upper end portion of the tubular support 182. Further, the supports 210 are vertically and horizontally adjustable relative to the mounting plate portion 204 by means of vertical slots (not shown) formed in the supports 210 and horizontal slots formed in the mounting plate portion 204 through which fasteners 205 utilized to secure the supports 210 to the mounting plate portion 204 are secured. In this manner, the relative elevations of the pulley wheels 206 and 208 may be adjusted in order to vary the amount the steering control member 66 is rotated in response to oscillation of the tubular support 182.

Also, since the pin 170 is loosely received in the notches F and R, the spring 152 applies a slight but continuous force on the various components in the shift control structure when the pin is seated in either notch F or R and therefor reduces any play in the shifting control structure whereby a more positive shifting of the related transmission shifting components is effected.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a boat including an oscillatable steering control and a throttle control shiftable between engine idle and open throttle positions, means operatively connecting said throttle control and steering control for slightly oscillating said steering control in response to movement of said throttle control from said idle position toward said open throttle position and back toward said idle position.

2. The combination of claim 1 including an inboard projecting handle member carried by said upper end engageable by the hand of a rearwardly facing observer for swinging the upper end of said standard rearwardly to close the throttle in the event a water skier falls.

3. In combination, a boat including a steering control shiftable from dead-ahead to opposite hard turning positions and a throttle control shiftable between engine idle and open throttle positions, means interconnecting said steering and throttle controls operative to shift said throttle control from said full throttle position toward said idle position in response to said steering control being shifted to said opposite hard turning positions.

4. The combination of claim 3 wherein said means also includes means operative to shift said steering control from either hard turning position toward said dead-ahead position in response to movement of said throttle control to said open throttle position.

5. The combination of claim 3 wherein said steering control includes a rotatable shaft portion extending lengthwise of the aft portion of said boat and said throttle control inclues a portion shiftable longitudinally of said boat, a steering bow comprising an elongated rod disposed transverse to said shaft portion, an elongated flexible tension member having its opposite ends anchored to opposite end portions of said rod and its mid-portion encircled about said shaft portion for longitudinal reciprocation of said bow between limit positions in response to oscillation of said shaft portion, stationary guide means adjacent and generally aligned with the path of reciprocation of said throttle control portion and disposed generally centrally intermediate the opposite ends of said rod when said rod is midway between said limit positions, and a second elongated flexible tension member attached to said rod centrally intermediate its opposite ends, guidingly engaged with said guide means, and having its other end projecting away from said rod generally along said path and connected to said throttle control portion.

6. In combination, a boat including a first manually shiftable throttle control actuator shiftable between engine idle and open throttle positions and a second manually shiftable transmission shift control actuator shiftable, independent of said throttle control actuator, between forward, neutral and reverse gear positions, means operatively interconnecting said shift control and said throttle control actuators for at least slightly advancing said throttle control actuator from said engine idle position toward said open throttle position in response to said shift control actuator being shifted from said neutral position to either of said forward and reverse positions.

7. The combination of claim 6 including second means, independent of the first mentioned means, adjacent said transmission shift control means operable to adjustably limit movement of said throttle in a direction closing said throttle.

8. In combination, a boat including a first manually operable throttle control actuator shiftable between engine idle and open throttle positions and a second manually operable transmission shift control actuator shiftable independent of said throttle control actuator, between forward, neutral and reverse gear positions, override means interconnecting said actuators preventing movement of said throttle control actuator past a predetermined position advanced only slightly past said engine idle position whenever said transmission shift control actuator is not in either of said neutral, forward and reverse positions.

9. The combination of claim 8 wherein said override means also includes means preventing movement of said shift control actuator from either of said neutral, forward and reverse positions when said throttle control actuator is advanced past said predetermined position.

10. The combination of claim 9 including means yieldingly urging said shift control toward means said forwar and reverse positions upon slight movement of said shift control means from said neutral position toward said forward and reverse positions, respectively.

11. In combination with a boat including a generally straight longitudinal side portion as well as oscillatable side mounted and longitudinally extending steering, throttle and shift control portions, a control console mounted in said boat for adjustable shifting along said side portion, said control console including oscillatable steering and throttle and transmission shift control actuators, said console also including means slidable along said control portions, independent of oscillation of said actuators, and releasably anchorable in adjusted position therealong operatively connecting said actuators to said control portions for oscillation of the latter in response to oscillation of the former.

12. In combination with a boat including a generally straight longitudinal side portion as well as side mounted and longitudinally extending steering and throttle controls, a control console mounted in said boat for adjustable shifting along said side portion, said control console including steering and throttle and transmission shift control actuators, said console also including means operatively connecting said actuators to said controls and adjustably shiftable longitudinally of the latter, said throttle control being shiftable between engine idle and open throttle positions and said steering control is oscillatable between opposite hard turning positions, and means operatively connecting said throttle control and steering control for slightly oscillating said steering control in response to movement of said throttle control from said idle position toward said open throttle position and back toward said idle position.

13. The combination of claim 12 including a throttle control shiftable between engine idle and open throttle positions, an upright standard pivotally supported at its lower end from said boat for oscillation about a generally horizontal axis extending transversely of said boat, a steering control actuator supported from the upper end of said standard for oscillation relative thereto and connected to said steering control for oscillation of the latter in response to oscillation of said actuator, means connecting said standard to said throttle control for shifting the latter in response to oscillation of said standard.

14. The combination of claim 13 including means interconnecting said steering and throttle controls operative to shift said throttle control from said full throttle position toward said idle position in response to said steering control being shifted toward said opposite hard turning positions.

15. The combination of claim 14 wherein said boat also includes transmission shift control means shiftable between forward, neutral and reverse gear positions, and means operatively connecting said shift control means to said throttle control for at least slightly advancing said throttle control from said engine idle position toward said open throttle position in response to said shift control being shifted from said neutral position to either of said forward and reverse positions.

16. The combination of claim 15 wherein said throttle control and transmission shift control means include coacting portions preventing movement of said throttle control past a predetermined position advanced only slightly past said engine idle position whenever said transmission shift control means is not in either of said neutral, forward and reverse positions.

17. In combination, a boat including a flooring structure and an upstanding side extending along one side marginal edge portion of said flooring structure, a steering and motor control assembly comprising an upright standard disposed adjacent said side and including a horizontally inboard projecting shaft portion on its lower end portion journalled from said flooring structure and defining a foot rest, said standard including an inboard and rearwardly angulated upper end portion from which a steering wheel is journalled, said steering wheel including means adapted for operative association with movable steering controls of said boat and said standard including means for operative connection with a movable engine speed control of said boat.

18. In combination, a boat including an oscillatable steering control and a throttle control shiftable between engine idle and open throttle positions, an upright standard pivotally supported at its lower end from said boat for oscillation about a generally horizontal axis extending transversely of said boat, a steering control actuator supported from the upper end of said standard of oscillation relative thereto and connected to said steering control for oscillation of the latter in response to oscillation of said actuator, means connecting said standard to said throttle control for shifting the latter in response to oscillation of said standard, said steering control actuator including a support housing journalled on said upper end for oscillation about an axis generally paralleling the first mentioned axis, said steering control actuator being oscillatably supported from said housing for rotation about an axis disposed generally normal to said axis.

19. The combination of claim 18 wherein said upper end is elongated and generally parallels the axis of rotation of the housing and said housing is also lengthwise shiftable along said upper end, and means operative to releasably secure said housing in adjusted shifted and rotated position relative to said upper end.

* * * * *